Figure 1:
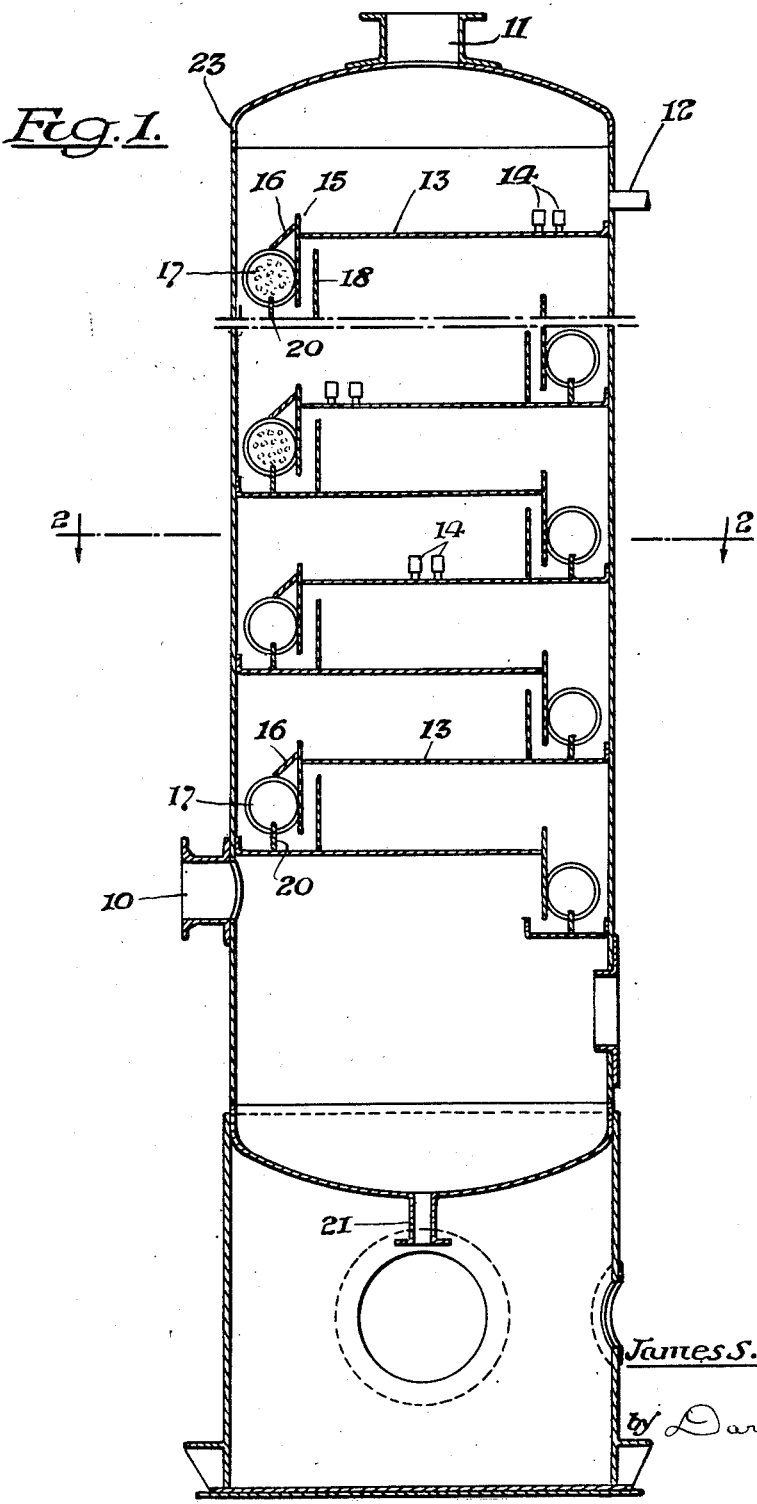

March 19, 1957 J. S. F. CARTER 2,785,961
ABSORPTION TOWER
Filed May 5, 1953 3 Sheets-Sheet 3

INVENTOR.
James S. F. Carter
BY Darby & Darby
ATTORNEYS.

United States Patent Office 2,785,961
Patented Mar. 19, 1957

2,785,961

ABSORPTION TOWER

James S. F. Carter, Oceanside, N. Y., assignor to Carter & Nansen Co., Inc., New York, N. Y., a corporation of New York Application May 5, 1953, Serial No. 353,154

6 Claims. (Cl. 23—283)

The present invention relates to apparatus for contacting gas or vapors with liquid and particularly to that type of apparatus commonly known as absorption towers.

More particularly still the invention relates to an absorption tower particularly adapted for the removal of ammonia from a mixture of gases by a counter-current operation in which the gases rise through water which flows downwardly from one tray to another of a series.

Since the absorption of ammonia is an exothermic process and may be conducted under high pressure conditions, for example, at 100 pounds per square inch, the problem of heat removal becomes critical.

Many attempts have been made to solve this problem, but all have resulted in bulky and expensive equipment. Amongst the solutions suggested in the past was the placing of cooling pipes within the tower and resting upon the absorption trays so as to occupy space thereon which resulted in decreasing the absorption capacity and was therefore not a satisfactory solution.

Another proposed solution of the problem was to pump the liquid into cooling chambers located outside the tower proper at various levels of the tower. This, of course, involved the erection of the framework at the chosen levels and provision for separately housed external coolers and resulted in complicated and expensive packing, pumping and piping, increasing the normal expectation of leakage and repair.

My present invention provides an absorption tower adapted to provide a large amount of cooling surface but without decreasing the absorption surface and without necessitating separately housed, external cooling chambers and the concomitant expense of erection and maintenance thereof.

In accordance with the present invention bundles of horizontally extending cooling tubes are provided, these tubes lying along chords of the cylindrical tower, a portion of the tubes lying therefore within the tower and the ends thereof lying outside the tower. In conjunction with the tube bundles weirs are provided so that the absorbing liquid flows downwardly from one tray to another passing over the bundle of cooling tubes as it descends, the cooling tubes at one level being at one side of the tower and at the next lower level at the opposite side, or in some instances cooling bundles may be provided at the ends of a bubble tray and at the center of the next lower bubble tray continuing alternately in this manner.

It is an object of the invention to provide an absorption tower of the bubble tray type particularly adapted for use in exothermic processes and wherein the cooling means does not materially interfere with the area available for absorption.

It is another object of the invention to provide such an absorption tower which requires no external cooling chambers and therefore eliminates the expensive and difficult to maintain external chambers together with the piping, packing and other piping adjuncts necessary.

Figure 2:
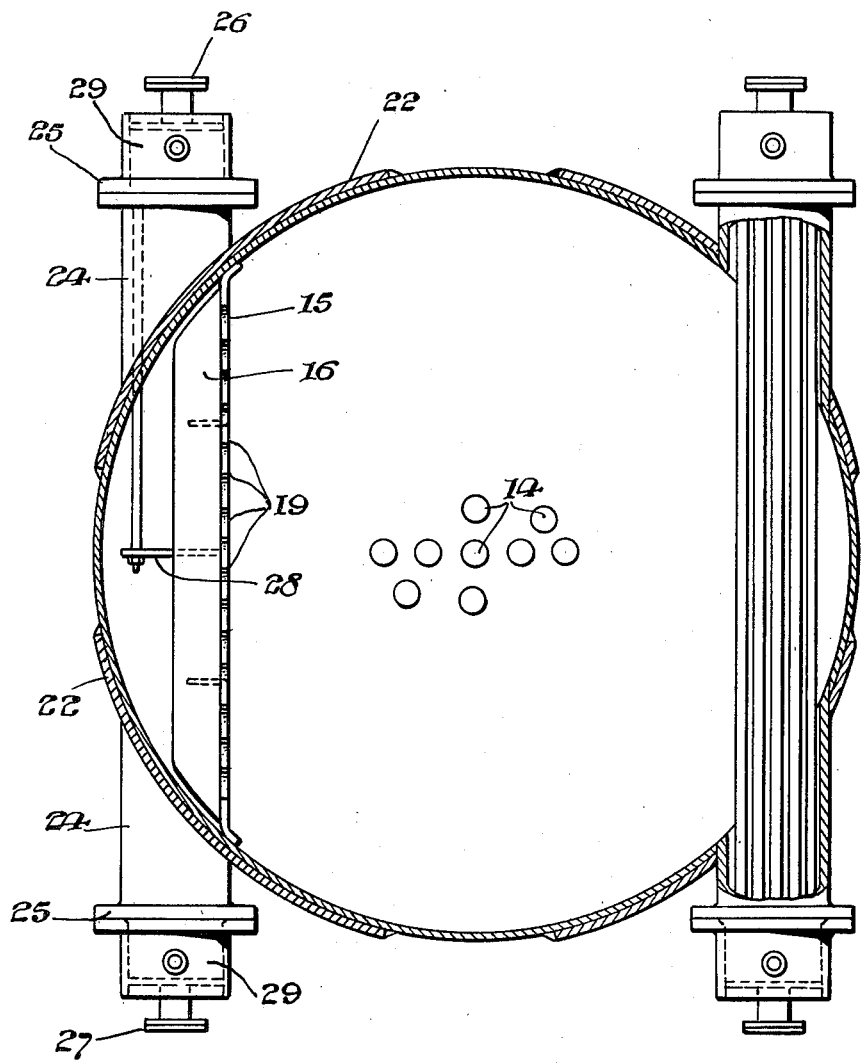
Figure 3:
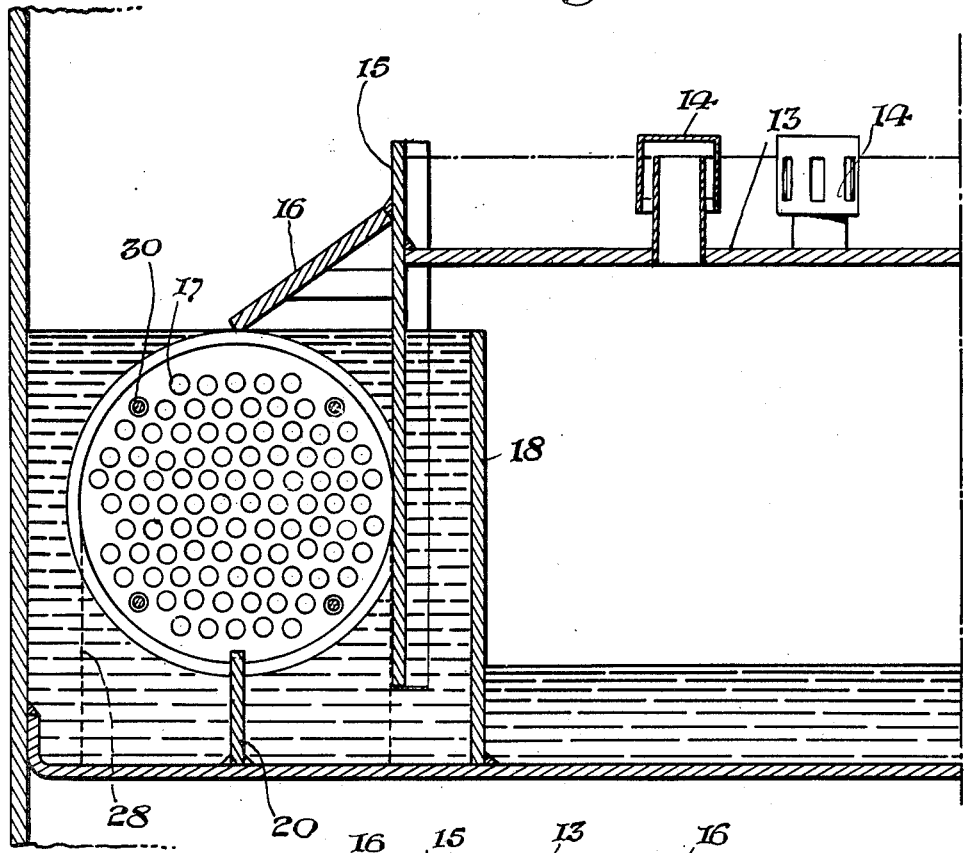
Figure 4:
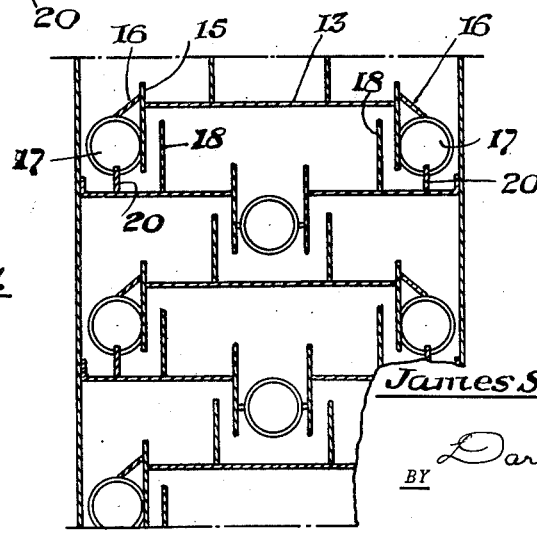

Other objects and features of the invention will be apparent when the following description is considered in connection with the annexed drawings, in which, Figure 1 is a broken vertical cross-sectional view of an absorpton tower in accordance with the present invention;

Figure 2 is a horizontal cross-sectional view of the absorption tower of Figure 1 showing particularly the arrangement of one bundle of cooling tubes and the headers therefor together with the weirs for directing the flow over these tubes and the mode of supporting the tubes within their housing and within the absorption tower proper;

Figure 3 is an enlarged vertical cross-sectional view of the cooling tower at a single level showing the details of location of the cooling tube bundles and of certain weirs which are provided to maintain the liquid level on the bubble trays at the desired height; and Figure 4 is a vertical cross-sectional view similar to Figure 1 showing that modification of the invention wherein the cooling tube bundles are located at diametrically opposite points on the perimeter of one bubble tray and at the center of the succeeding lower bubble tray, the pattern being followed throughout the bubble tray arrangement so that the flow is that known as a double cross-current flow.

Referring now to the drawings and particularly to Figure 1 thereof, gases which enter the tower through lower inlet 10 rise and are absorbed by the water, the nonabsorbed portion being taken off at 11. Water enters the upper inlet 12 and flows onto the uppermost horizontal flat tray 13 which tray is provided with risers therethrough and with bubble caps 14 of any usual type. The liquid level is maintained on the tray 13 by means of a weir 15 so as to ensure that the slots formed in the bubble caps 14 are submerged. From the uppermost tray 13 the liquid flows past serrations 19 in the notched weir 15 over a deflecting plate 16 onto a bundle of pipes 17 the details of which will be described later.

The weir 15 extends downwardly and below the level of liquid in the next lower tray 13 and a blocking plate or weir 18 is provided in order to maintain the liquid level at the top of the bundle of tubes 17. Additionally a baffle plate 20 is provided located substantially on the center line of the tube bundle and extending above the level of the bottom of weir 15 which plate prevents a flow of liquid over the deflecting plate 16 down the side wall of the tower and across the tray without coming into contact with the cooling tubes 17.

At each tray level the arrangement above-described is repeated, the cooling tube bundles, however, being located at opposite sides of the bubble trays. Thus the descending liquid passes over the uppermost tray, thence over the tube bundle at the left of that tray, back to the right over the next lower tray, over the next bundle of cooling tubes, etc. until it finally reaches the lowermost tray and is discharged over the lowermost bundle of cooling tubes and drawn off at the outlet 21.

The details of the arrangement of the tube bundles and cooperating parts are best seen in Figures 1 and 2. As shown in those figures plates 22, arcuate in shape, are welded to the external wall 23 of the cooling tower, these plates having cylindrical housings 24 fixed thereto thus forming cylinders intersecting the cylindrical tower wall 23. At either end of the housing 24 tube sheets 25 are provided and tubes 17 extend from one bonnet or header 29 to the other of the pair.

Cooling fluid is pumped into an inlet such as 26 and out through an outlet such as 27, the various inlets and outlets being arranged in any desired fashion. Although a parallel arrangement so that the cooling fluid passes through one set of tubes only, is preferred, the cooling liquid may pass through two or more sets of tubes 17 in series.

The tubes are supported in a tube-supporting plate 28 which rests upon the next lower tray 13 and is held in position by the tie rods 30 which extend between plate 28 and one of the tube sheets 25 (see Figures 2 and 3).

In Figure 4 is shown a modification of the invention wherein the tube bundles are located on chords at diametrically opposite points of alternate trays and centrally of the intervening trays. Consequently, the flow is outwardly from the uppermost tray, through the cooling tube bundles at the periphery and thence inwardly over the next lower tray to the center thereof, through a diametrically extending opening and thence through a bundle of cooling tubes 17 extending along a diameter of the tray and parallel to the bundles at the peripheries of adjacent trays and outwardly over this third tray, the pattern being repeated until the liquid is finally discharged.

While I have described the preferred embodiment of my invention it will be understood that many other modifications may be made without deviating from the principles thereof. For example, the cooling tower proper might be rectangular in cross section, and likewise the tube bundles and the tube bundle housings might be rectangular rather than circular in cross section. I wish, therefore, to be limited not by the foregoing description but on the contrary solely by the claims granted to me.

What is claimed is:

1. In a cylindrical absorption tower of the type having a plurality of circular bubble trays and requiring cooling of the absorbing liquid, the improvement which comprises terminating alternate trays along chords lying at opposite ends of a diameter, dividing the intervening trays into two portions separated by a slot lying parallel to the terminating chords of the alternate trays, mounting a bundle of cooling fluid tubes above the alternate trays at the center thereof and beneath the slot in the intervening tray next above and mounting pairs of bundles of cooling fluid tubes above each intervening tray, each said pair of bundles being beneath the space between the terminating chord of an alternate tray and the wall of the absorption tower weirs adjacent the edges of each bubble tray to maintain the fluid at a desired level, said tube bundles mounted above the intervening trays having their ends extending exteriorly of the absorption tower and being mounted in housings fixed to said absorption tower whereby liquid flows outwardly over one tray downwardly through said cooling fluid bundles, inwardly over the next lower tray and downwardly through the center cooling fluid tube bundle.

2. In a cylindrical absorption tower of the type having a plurality of transverse generally circular bubble trays, and requiring cooling of the absorbing liquid, the improvement which comprises terminating each tray along a chord and leaving a space between said tray and the cylindrical wall of the tower, alternate trays being thus spaced from the tower wall at opposite edges, a bundle of cooling fluid tubes located below said tray at the side adjacent the terminating chord of said tray, said tube bundle being also located within the space defined by the planes of a pair of adjacent trays, a baffle wall connected to the upper of said pair of trays and terminating short of the lower of said trays and extending downwardly adjacent the bundle of cooling fluid tubes, a vertically upstanding weir connected to the lower of said pair of trays and extending substantially as high as the top of the bundle of cooling tubes, said baffle extending generally parallel to said weir and between said weir and the lower wall nearest the weir, the lower edge of said baffle extending substantially as low as the lowermost cooling tube in said bundle, adjacent trays having bubble caps therein and overflow weirs along said terminating chords.

3. An absorption tower as claimed in claim 2, characterized in that each said cooling fluid tube bundle extends in a direction substantially parallel to the terminating chord of the trays, the ends of the tubes in said bundle extending outside the walls of the tower, said tube ends being placed in housings fixed to the walls of the cooling tower proper.

4. A device as claimed in claim 2, characterized in that said tube bundles and the housings therefor are generally cylindrical.

5. A device as claimed in claim 2, characterized in that a deflection plate is provided for each tray, each said deflection plate extending across said weir, said deflection plate guiding liquid from a tray over the bundle of cooling fluid tubes supported above the next lower tray.

6. A device, as claimed in claim 2, characterized in that a baffle plate extends substantially longitudinally of each said tube bundle, said baffle plate being mounted on said tray and extending upwardly, said plates serving to prevent absorbing liquid from flowing along the walls of the absorption tower and out onto a lower tray without passing through said bundle of cooling fluid tubes.

References Cited in the file of this patent

UNITED STATES PATENTS

| | | |
|---|---|---|
| 731,799 | Lummus | June 23, 1903 |
| 1,759,750 | Kotzebue | May 20, 1930 |
| 2,206,495 | Beardsley et al. | July 2, 1940 |
| 2,451,433 | Davis | Oct. 12, 1948 |